(No Model.)
J. KEMP.
HAY PRESS.
No. 260,757. Patented July 11, 1882.
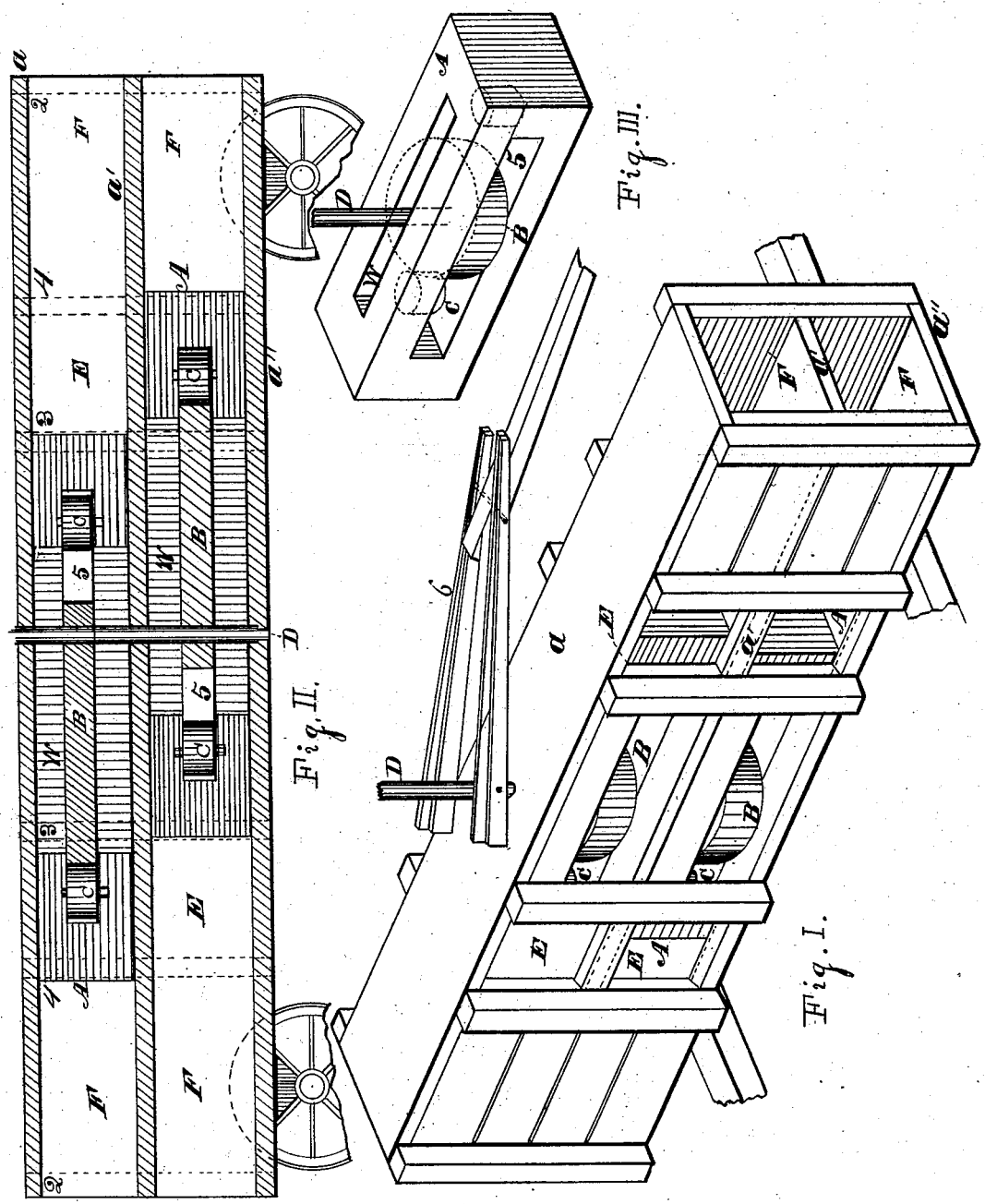
Witnesses
O. M. Matthews.
Horace Long.
Inventor.
James Kemp
By G. L. Chapin, Atty.

UNITED STATES PATENT OFFICE.

JAMES KEMP, OF NEAR KEMPTON, LIVINGSTON COUNTY, ILLINOIS.

HAY-PRESS.

SPECIFICATION forming part of Letters Patent No. 260,757, dated July 11, 1882.

Application filed May 12, 1882. (No model.)

*To all whom it may concern:*

Be it known that I, JAMES KEMP, of near Kempton, and in the county of Livingston and State of Illinois, have invented a new and useful Improvement in Hay-Presses, of which the following is a specification, reference being had to the accompanying drawings and letters and figures marked thereon, illustrating the improvement, in which—

Figure I is a perspective representation of a mechanism embodying my invention; Fig. II, a longitudinal section thereof through the center; Fig. III, a perspective representation of one of the plungers and a portion of the driving mechanism removed from the other parts, better to show the construction.

The nature of the invention consists in plungers which are slotted out horizontally and longitudinally to receive the driving-eccentrics, and slotted out vertically to permit the driving-shafts to pass through and the plungers to have a longitudinal reciprocating movement alternately to press bales of hay.

In this press two plungers are employed, each end of each plunger operating in a pressing-box, as the whole in detail is hereinafter fully described and shown.

$a$ $a''$ represent the top and bottom of the press-frame, and $a'$ the partition between the plungers and pressing-boxes F, of which there are four—two at each end of the frame—extending from 2 to 3.

At from 2 to 4 are shown the lengths the bales are to have when pressed, and from 4 to 3 are shown the distances the plungers move to compress the bale.

On one side of the press, between $a''$ and $a'$, and between $a'$ and $a$, and between 3 and 4, are formed openings for filling the pressing-boxes with hay or the material to be baled.

Between the bottom $a''$ and the partition $a'$, and between the partition $a'$ and top $a$, are placed the plungers A A, of such width and height as practically to fill the pressing-boxes F F, and such length as to reach from H at the left of the mid-length of Fig. I to 3 at the right of the center for the upper plunger, as shown, the lower plunger projecting to the right of the middle of the press the same distance as the upper one projects to the left. Both plungers have the same construction, and their positions are reversed in the pressing-boxes at each turn of the eccentrics B B. These eccentrics in practice are to be four feet in diameter, and the slots 5 are formed long enough to receive eccentrics B and anti-friction wheels C C at each end thereof, as shown at Figs. I, II, and III.

The eccentrics B are round, but are provided with shaft attachments so far from their centers that when the shaft D is turned the plungers will have given to them a throw endwise corresponding to the positions they are shown in at Figs. I and II. Holes made in the eccentrics for the shaft D at about one-eighth of the diameter of each from the periphery will support the eccentrics in position properly to give alternate movements to the plungers. When the eccentrics are properly attached to the shaft D the periphery of each will overlap to about the center of the other when the plungers are in half position—that is, when both plungers are equal distances on either side of shaft D. Then the further turning of the eccentrics will place the plungers in the position shown.

The vertical drive-shaft D has proper bearings in the bottom $a''$, partition $a'$, and the top $a$, and the anti-friction-wheels C C are pivoted to the margins of the slots 5.

Slots W are formed in plungers vertically to enable them to have longitudinal movements on the shaft D.

I prefer to apply the action of the eccentrics so that only a bale will be pressed at a time by the plungers. One bale at each end of the press, however, may be pressed at a time by changing the position of the eccentrics on the shaft D, and the pressing-boxes may be so fed that only one bale will be pressed at a time.

The heads at the outer ends of the press are omitted as not necessary to the understanding of the improvement.

The shaft D is to be rotated by any suitable power, in the drawings a draft-beam, 6, being employed for that purpose.

I claim as new—

As an improvement in hay-presses, one or more plungers, A, slotted out horizontally and vertically and combined with an eccentric, B, and two anti-friction wheels, C C, operated to press a bale of hay at either end, in combination with pressing-boxes E, as and for the purpose specified.

JAMES KEMP.

Witnesses:
FRANK CARY,
LOUIS BROWN.